(12) United States Patent
Ham et al.

(10) Patent No.: US 9,431,664 B2
(45) Date of Patent: Aug. 30, 2016

(54) METHOD OF PREPARING NICKEL-ALUMINUM ALLOY POWDER AT LOW TEMPERATURE

(71) Applicant: KOREA INSTITUTE OF SCIENCE AND TECHNOLOGY, Seoul (KR)

(72) Inventors: Hyung Chul Ham, Seoul (KR); Shin Ae Song, Seoul (KR); Seong Cheol Jang, Seoul (KR); Yong Min Kim, Seoul (KR); Jonghee Han, Seoul (KE); Hyoung-Juhn Kim, Suwon-si (KR); Tae Hoon Lim, Seoul (KR); Suk Woo Nam, Seoul (KR); Sung Pil Yoon, Seongnam-si (KR); Chang Won Yoon, Seoul (KR); Yeong Cheon Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 445 days.

(21) Appl. No.: 14/043,263

(22) Filed: Oct. 1, 2013

(65) Prior Publication Data
US 2014/0335442 A1    Nov. 13, 2014

(30) Foreign Application Priority Data
May 7, 2013  (KR) ......................... 10-2013-0051457

(51) Int. Cl.
| | |
|---|---|
| H01M 4/90 | (2006.01) |
| B22F 5/00 | (2006.01) |
| B22F 9/20 | (2006.01) |
| C22C 1/04 | (2006.01) |
| H01M 4/86 | (2006.01) |
| H01M 4/88 | (2006.01) |

(52) U.S. Cl.
CPC .............. *H01M 4/905* (2013.01); *B22F 5/006* (2013.01); *B22F 9/20* (2013.01); *C22C 1/0433* (2013.01); *H01M 4/8621* (2013.01); *H01M 4/8803* (2013.01); *B22F 2999/00* (2013.01)

(58) Field of Classification Search
CPC ......... H01M 4/905; B22F 5/006; B22F 9/20; B22F 2999/00; B22F 2201/20; C22C 1/0433
See application file for complete search history.

(56) References Cited

U.S. PATENT DOCUMENTS

| | | | | |
|---|---|---|---|---|
| 5,458,847 A | * | 10/1995 | Hu | ........................ C22C 1/0491 419/61 |
| 6,893,481 B2 | * | 5/2005 | Nam | ........................ H01M 4/90 75/351 |

FOREIGN PATENT DOCUMENTS

| | | |
|---|---|---|
| KR | 10-0480830 | 4/2005 |
| KR | 10-0609158 | 7/2006 |
| KR | 10-2007-0016628 | 2/2007 |
| KR | 10-2007-0109440 | 11/2007 |

OTHER PUBLICATIONS

G.W. Huber et al., "Raney Ni-Sn Catalyst for H2 Production from Biomass-Derived Hydrocarbons", Science 300, 2075, (2003).

* cited by examiner

*Primary Examiner* — Muhammad Siddiquee
(74) *Attorney, Agent, or Firm* — Goldilocks ZONE IP LAW

(57) ABSTRACT

Provided is a method for preparing nickel-aluminum alloy powder at low temperature, which is simple and economical and is capable of solving the reactor corrosion problem. The method for preparing nickel-aluminum alloy powder at low temperature includes: preparing a powder mixture by mixing nickel powder and aluminum powder in a reactor and adding aluminum chloride into the reactor (S1); vacuumizing the inside of the reactor and sealing the reactor (S2); and preparing nickel-aluminum alloy powder by heat-treating the powder mixture in the sealed reactor at low temperature (S3).

5 Claims, 5 Drawing Sheets

METHOD OF PREPARING NICKEL-ALUMINUM ALLOY POWDER AT LOW TEMPERATURE

CROSS-REFERENCE TO RELATED APPLICATION

This application claims priority to Korean Patent Application No. 10-2013-0051457, filed on May 7, 2013, and all the benefits accruing therefrom under 35 U.S.C. §119, the contents of which in its entirety are herein incorporated by reference.

BACKGROUND

1. Field

The present disclosure relates to a method for preparing nickel-aluminum alloy powder at low temperature, more particularly to a method for preparing nickel-aluminum alloy powder at low temperature by adding aluminum chloride as a reaction accelerator to a powder mixture of nickel powder and aluminum powder and carrying out reaction in vacuum, thus preventing inter-particle aggregation and avoiding the need of pulverization without requiring supply of high-purity hydrogen for the purpose of preventing oxidation.

2. Description of the Related Art

Nickel-aluminum alloy is an inter-metal compound whose use in high-temperature applications is expected. Recently, the material is put to practical use as high-temperature parts for heat treatment, die materials for forging and die materials for die casting.

In particular, applicability as hydrogen-generating catalyst, for example, in fuel cells have been proposed and the applications of the inter-metal compound as catalyst are being extended (*Science*, 300(27), 2075-2077, 2003).

In the general method for preparing nickel-aluminum alloy, since nickel and aluminum particles are molten and mixed to form a solid solution, heat treatment at high temperature of 1400° C. or above is necessary. Further, the heat treatment has to be performed under high-purity hydrogen atmosphere to prevent oxidation of nickel and aluminum.

In the existing general method, the alloy is obtained in the form of aggregate due to inter-particle sintering because the preparation is carried out at high temperature. Accordingly, the nickel-aluminum alloy aggregate needs to be pulverized into particles for use in catalysts, electrodes or other applications. Hence, an additional pulverization process is required for the preparation of nickel-aluminum alloy particles. These factors contribute to increased price of nickel-aluminum alloy powder.

The inventors of the present disclosure have proposed a method for manufacturing a nickel-aluminum inter-metal compound for fuel cells using aluminum chloride ($AlCl_3$). According to the method, it is possible to prepare a nickel-aluminum inter-metal compound below the melting points of nickel (Ni) and aluminum (Al) (U.S. Pat. No. 6,893,481; Korean Patent No. 10-0480830).

Although this method significantly lowers the temperature at which the nickel-aluminum alloy is prepared, the prepared nickel-aluminum particles are obtained in aggregate form and an additional pulverization process is necessary.

In addition, expensive high-purity hydrogen has to be flown continuously during heat treatment to prevent oxidation of nickel and aluminum. Furthermore, it is necessary to continuously supply aluminum chloride ($AlCl_3$) vapor in order to promote it is reaction at low temperature. Since aluminum chloride ($AlCl_3$) is highly corrosive, it may corrode the pipeline, electric furnace or the like, thereby reducing the life span of equipments or utilities.

In order to solve these problems, the inventors of the present disclosure propose a method for preparing nickel-aluminum alloy powder at low temperature by adding aluminum chloride as a reaction accelerator to a powder mixture of nickel powder and aluminum powder and carrying out reaction in vacuum, thus preventing inter-particle aggregation.

REFERENCES OF THE RELATED ART

Patent Documents (Patent document 1) Korean Patent No. 10-0480830
(Patent document 2) U.S. Pat. No. 6,893,481

SUMMARY

The present disclosure is directed to providing a method for preparing nickel-aluminum alloy powder at low temperature by adding aluminum chloride as a reaction accelerator to a powder mixture of nickel powder and aluminum powder and carrying out reaction in vacuum, thus preventing inter-particle aggregation and avoiding the need of pulverization without requiring supply of high-purity hydrogen for the purpose of preventing oxidation.

In one aspect, there is provided a method for preparing nickel-aluminum alloy powder at low temperature, including: preparing a powder mixture by mixing nickel powder and aluminum powder in a reactor and adding aluminum chloride into the reactor (S1); vacuumizing the inside of the reactor and sealing the reactor (S2); and preparing nickel-aluminum alloy powder by heat-treating the powder mixture in the sealed reactor at low temperature (S3).

In an exemplary embodiment, in S1, the aluminum powder may be included in an amount of 0.1-24 wt % based on the weight of the powder mixture and the aluminum chloride.

In an exemplary embodiment, in S1, the aluminum chloride may be included in an amount of 0.01-5 wt % based on the weight of the powder mixture and the aluminum chloride.

In an exemplary embodiment, in S2, the degree of vacuum inside the reactor may be maintained at $10^{-1}$ Torr or below.

In an exemplary embodiment, in S3, the temperature inside the reactor may be 300-700° C.

In another aspect, there is provided a green sheet manufactured with nickel-aluminum alloy powder prepared by the above-described method.

In another aspect, there is provided an electrode for a fuel cell manufactured with nickel-aluminum alloy powder prepared by the above-described method.

The method for preparing nickel-aluminum alloy powder at low temperature requires no additional pulverization process because inter-particle aggregation may be prevented during the preparation of nickel-aluminum alloy powder.

Further, since the supply of expensive high-purity hydrogen is unnecessary, the related process becomes economical. In addition, since the reaction accelerator aluminum chloride ($AlCl_3$) is used in small amount, corrosion of the reactor may be prevented.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
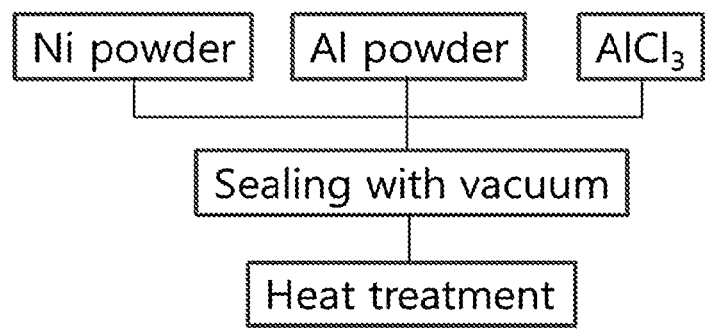
FIG. 1 schematically describes a method for preparing nickel-aluminum alloy powder at low temperature according to an exemplary embodiment of the present disclosure.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

The present disclosure provides a method for preparing nickel-aluminum alloy powder at low temperature, which is simple and economical and is capable of solving the reactor corrosion problem.

To this end, the present disclosure provides a method for preparing nickel-aluminum alloy powder at low temperature, including: preparing a powder mixture by mixing nickel powder and aluminum powder in a reactor and adding aluminum chloride into the reactor (S1); vacuumizing the inside of the reactor and sealing the reactor (S2); and preparing nickel-aluminum alloy powder by heat-treating the powder mixture in the sealed reactor at low temperature (S3).

Hereinafter, each step is described in detail.

First, a powder mixture is prepared by introducing nickel powder and aluminum powder into a reactor and mixing them and adding aluminum chloride ($AlCl_3$) into the reactor as a reaction accelerator (S1).

Specifically, the aluminum powder may be included in an amount of 0.1-24 wt % based on the weight of the nickel powder, the aluminum powder and the reaction accelerator.

If the content of the aluminum is less than 0.1 wt %, alloying of the nickel powder and the aluminum powder may not occur in S3. And, if it exceeds 24 wt %, the desired nickel-aluminum alloy ($Ni_3Al$) powder may not be formed.

Specifically, the aluminum chloride introduced as the reaction accelerator may be included in an amount of 0.01-5 wt % based on the weight of the nickel powder, the aluminum powder and the reaction accelerator. If the content of the aluminum chloride is less than 0.01 wt %, alloying of the nickel powder and the aluminum powder may not occur effectively in S3. And, if it exceeds 5 wt %, an additional purification process may be necessary since the aluminum chloride may act as impurities during the alloying of the nickel powder and the aluminum powder.

The aluminum chloride is not particularly limited in form. For example, it may be introduced in the form of vapor. For instance, the aluminum chloride may be introduced into the reactor using a carrier gas such as hydrogen, nitrogen, helium or argon. In this case, the carrier gas including the aluminum chloride may be introduced into the reactor using an evaporator.

The content excluding those of the aluminum powder and the aluminum chloride powder is that of the nickel powder.

The mixing is performed inside the reactor. Although not being limited thereto, ball milling or dry mixing may be used for the mixing to obtain pure nickel-aluminum alloy ($Ni_3Al$) powder.

The reactor used in the present disclosure is not particularly limited as long as the inside of the reactor may be maintained in vacuum state.

Next, the inside of the reactor is vacuumized and the reactor is sealed tightly from the outside air (S2).

In the present disclosure, it is very important to maintain the inside of the reactor in vacuum state. This is because, by lowering the pressure inside the reactor, inter-particle aggregation may be avoided during the preparation of nickel-aluminum alloy powder in S3 and thus the nickel-aluminum alloy powder may be obtained in powder form, not in aggregate form. As a result, an additional pulverization process for pulverizing aggregate is unnecessary for the nickel-aluminum alloy powder prepared according to the present disclosure for use in catalysts or electrodes.

Specifically, the degree of vacuum inside the reactor may be maintained at $10^{-1}$ Torr or below. If the degree of vacuum is above $10^{-1}$ Torr, the desired reaction may not occur since aluminum oxide is formed.

Next, nickel-aluminum alloy powder is prepared by heat-treating the powder mixture in the sealed reactor at low temperature (S3).

The reactions that occur in S3 are as follows.

$AlCl_3 + Al(s) \leftrightarrow AlCl(g) + AlCl_2(g)$   Reaction Formula 1

$Ni(s) + 2AlCl(g) \leftrightarrow 2NiAl + Cl_2(g)$   Reaction Formula 2

$2AlCl_2(g) + Cl_2(g) \leftrightarrow 2AlCl_3(g)$   Reaction Formula 3

The nickel-aluminum inter-metal compound formed on the surface of nickel particles during these reactions diffuses into the particles and control of reaction time and reaction temperature is necessary for the diffusion.

Unlike the high-temperature heat treatment performed at 1400° C. or above in the existing art, the heat treatment at low temperature is conducted at low temperature of 300-700° C. Accordingly, the inside of the reactor may be maintained at 300-700° C.

If the temperature inside the reactor is below 300° C., the nickel-aluminum alloy powder desired by the present disclosure may not be prepared. And, if the temperature inside the reactor is above 700° C., aluminum may melt and it is undesirable in terms of economy.

The heat-treating time is not particularly limited. For example, the heat-treating time may be 0.1-40 hours and may be varied according to the content of the aluminum chloride used as the reaction accelerator. For example, the heat-treating time may be reduced when the content of the aluminum chloride is increased.

The method for preparing nickel-aluminum alloy powder at low temperature is simple as compared to the existing method since inter-particle aggregation may be prevented and a pulverization process is unnecessary.

Further, since the supply of expensive high-purity hydrogen for preventing oxidation is unnecessary, the related process becomes economical.

In addition, since the aluminum chloride is used in a relatively small amount, corrosion of the reactor by the corrosive aluminum chloride may be prevented.

The nickel-aluminum alloy powder prepared according to the method of the present disclosure may be prepared into a green sheet through tape casting and may also be prepared into a porous electrode or a support for a fuel cell.

EXAMPLES

Hereinafter, the present disclosure will be described in detail through examples. However, the following examples are for illustrative purposes only and it will be apparent to those of ordinary skill in the art that the scope of the present disclosure is not limited by the examples.

Nickel-aluminum alloy powder was prepared at low temperature as follows.

First, nickel powder (6.3 μm, Inco 255, Inconel, Inc.), aluminum powder (4.2 μm, Alfa Aesar) and $AlCl_3$ (Junsei) were added to a quartz ampoule. After lowering the pressure inside the ampoule below $10^{-4}$ Torr using a diffusion pump, the quartz ampoule was sealed. Then, the quartz ampoule was heat-treated at 300-600° C. The preparation process of the nickel-aluminum alloy powder is schematically shown in FIG. 1.

Examples 1a-1e and 2-6

In Examples 1a-1e, nickel-aluminum alloy powder was prepared as described above, except for varying the heat-treating time as shown in Table 1.

In Examples 1a and 2-4, nickel-aluminum alloy powder was prepared as described above, except for varying the heat-treating temperature as shown in Table 1.

In Examples 1a, 5 and 6, nickel-aluminum alloy powder was prepared as described above, except for varying the content of aluminum chloride as shown in Table 1.

TABLE 1

|  | $AlCl_3$ content (wt %) | Heat-treating temperature (° C.) | Heat-treating time (h) |
| --- | --- | --- | --- |
| Example 1a | 0.2 | 400 | 3 |
| Example 2 | 0.2 | 300 | 3 |
| Example 3 | 0.2 | 500 | 3 |
| Example 4 | 0.2 | 600 | 3 |
| Example 1b | 0.2 | 400 | 5 |
| Example 1c | 0.2 | 400 | 10 |
| Example 1d | 0.2 | 400 | 20 |
| Example 1e | 0.2 | 400 | 30 |
| Example 5 | 0.5 | 400 | 3 |
| Example 6 | 1.0 | 400 | 3 |

Figure 2:
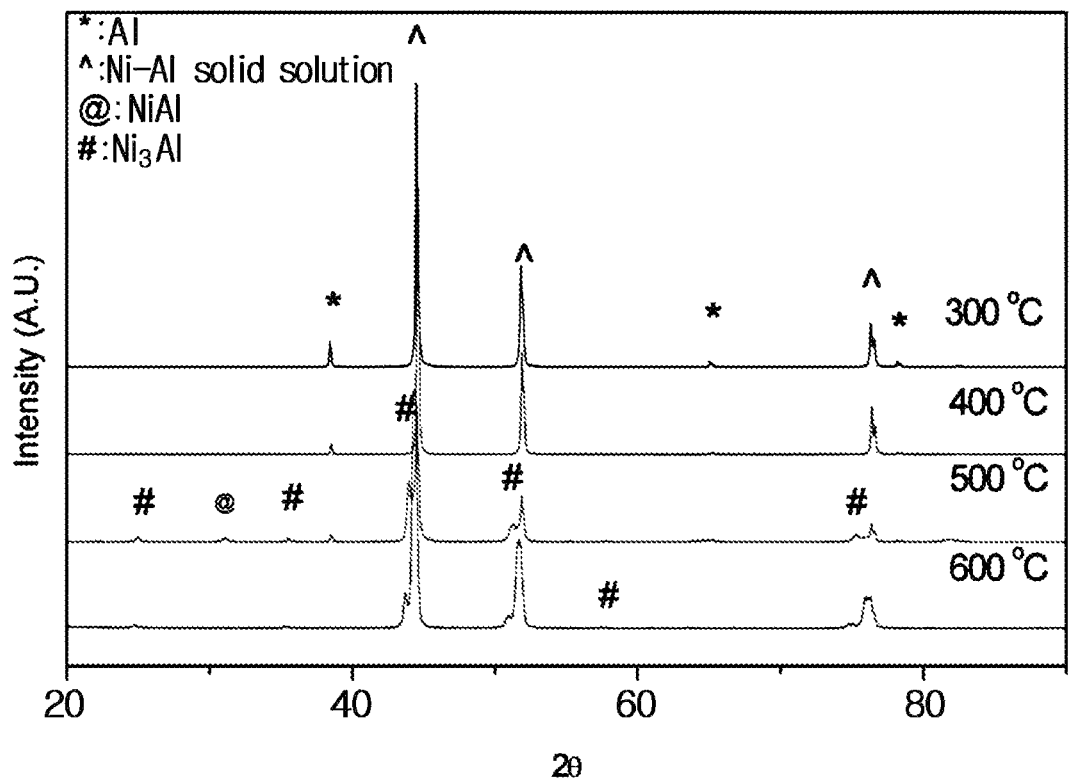
FIG. 2 shows XRD patterns of nickel-aluminum alloy powder prepared according to exemplary embodiments of the present disclosure by heat-treating for 3 hours at 300° C. (Example 2), 400° C. (Example 1a), 500° C. (Example 3) and 600° C. (Example 4) after adding aluminum chloride vapor.

Referring to Table 1 and the XRD analysis result of FIG. 2, the heat-treated sample of Example 1a shows an Al peak, the peak is much smaller than that of the heat-treated sample of Example 2. This suggests that reaction between the nickel powder and the aluminum powder begins at 400° C. The Al peak disappeared in Examples 3 and 4. This means that nickel-aluminum alloy powder is prepared from the reaction of the nickel and aluminum powders by the reaction accelerator aluminum chloride below the melting points of the two metals (nickel and aluminum).

Figure 3:
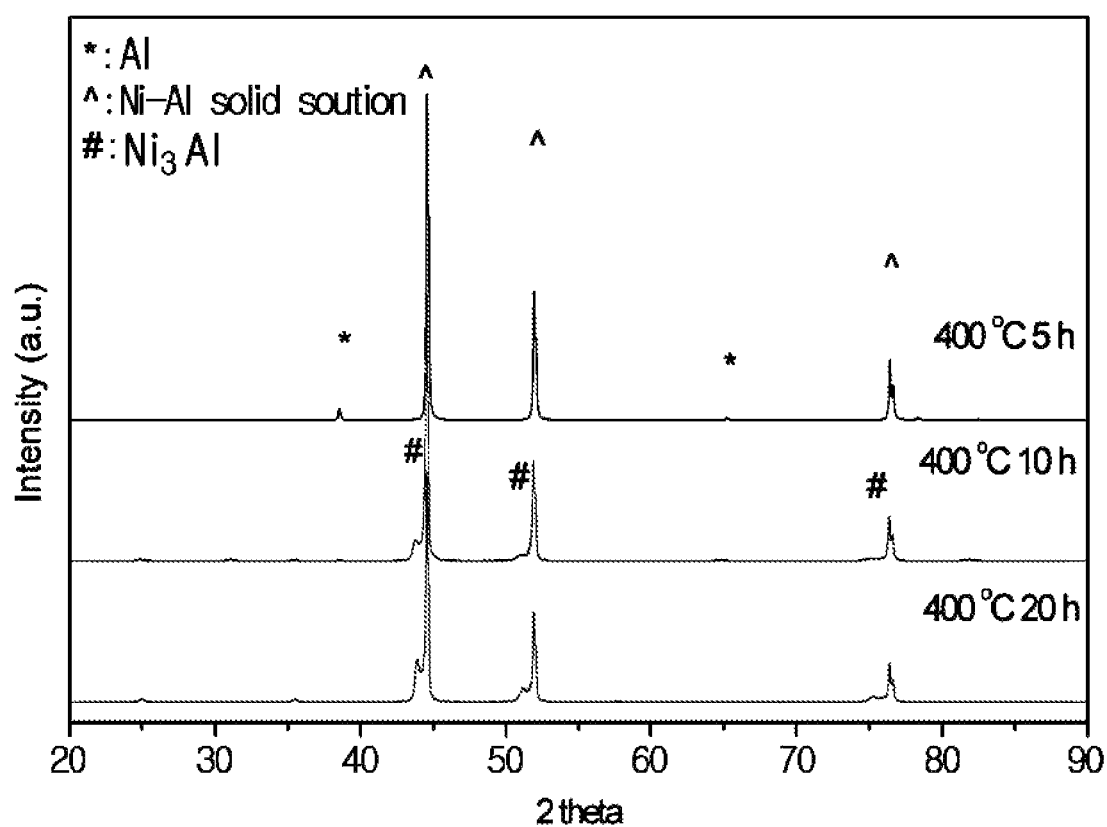
FIG. 3 shows XRD patterns of nickel-aluminum alloy powder prepared according to exemplary embodiments of the present disclosure by heat-treating at 400° C. for 5 hours (Example 1b), 10 hours (Example 1c) and 20 hours (Example 1d) after adding aluminum chloride vapor.

And, referring to Table 1 and the XRD analysis result of FIG. 3, the sample of Example 1b still shows Al peaks but, as the heat-treating time increases, Example 1d shows only the peaks of the nickel-aluminum inter-metal compound and the Ni—Al solid solution. Accordingly, it can be seen that the nickel-aluminum alloy powder may be prepared enough even at the low reaction temperature of 400° C. although a slightly longer heat-treating time is required. And, all the samples heat-treated at 400° C. were obtained in powder form, not in aggregate form.

Figure 4:
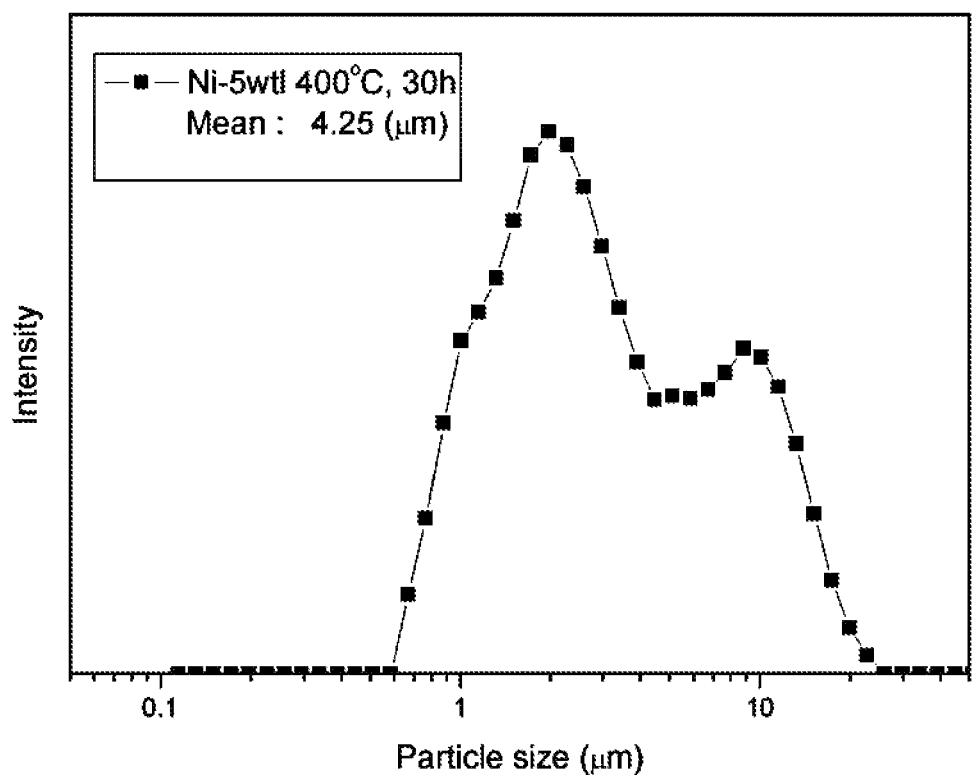
FIG. 4 shows particle size distribution of nickel-aluminum alloy powder prepared according to exemplary embodiments of the present disclosure by heat-treating at 400° C. for 30 hours (Example 1e) after adding aluminum chloride vapor.
Figure 5:
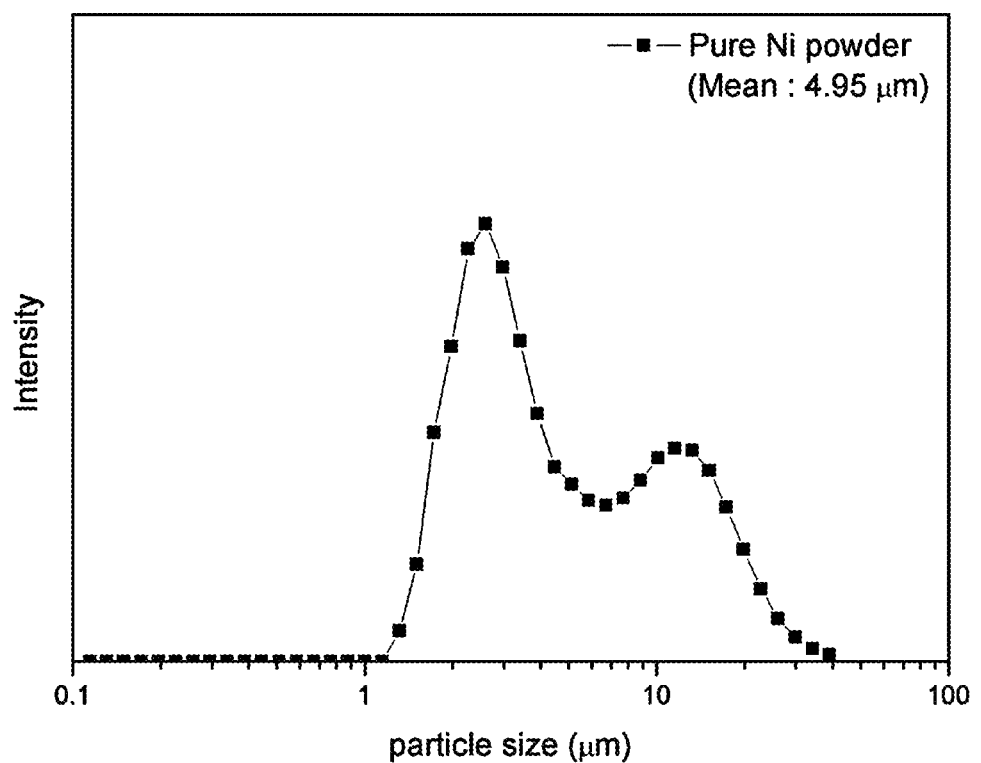
FIG. 5 shows particle size distribution of pure nickel powder used as source material in an exemplary embodiment of the present disclosure.

Referring to Table 1 and the particle size distribution of FIG. 4, the heat-treated sample of Example 1e shows a mean particle size of about 4.25 μm although pulverization was not conducted after the heat treatment. This is almost comparable to that of the mean particle size of pure nickel particles (4.95 μm, see FIG. 5). This demonstrates that the method for preparing nickel-aluminum alloy powder according to the present disclosure requires no additional pulverization process.

Figure 6:
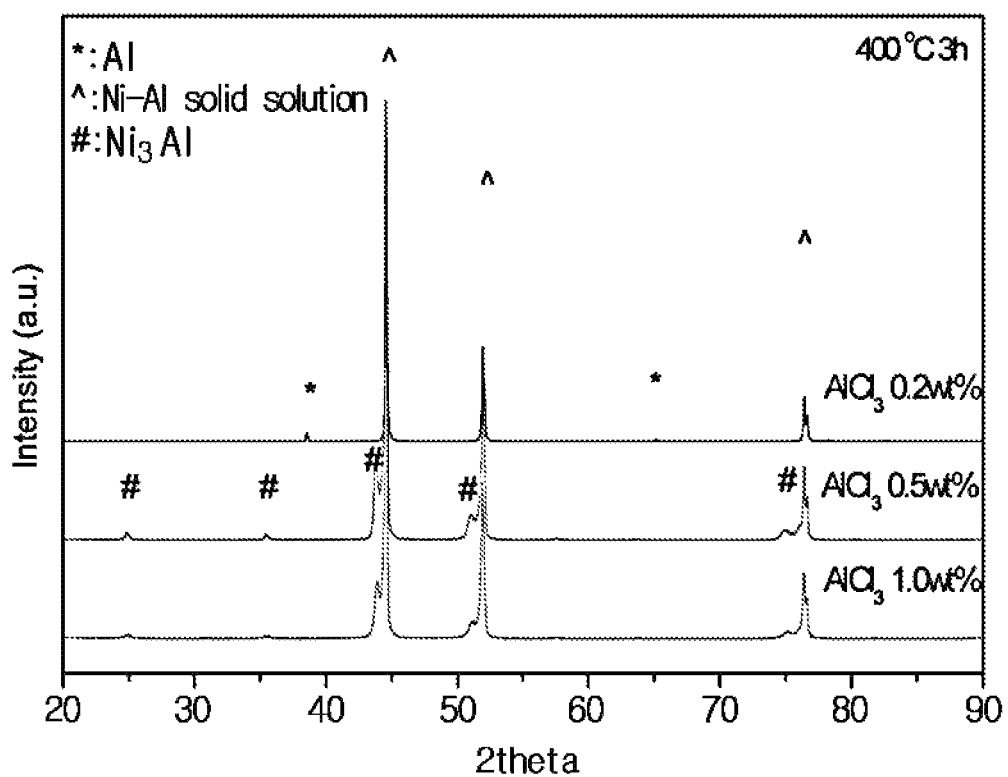
FIG. 6 shows XRD patterns of nickel-aluminum alloy powder prepared according to exemplary embodiments of the present disclosure by heat-treating at 400° C. for 3 hours after adding 0.2 wt % (Example 1a), 0.5 wt % (Example 5) and 1.0 wt % (Example 6) of aluminum chloride vapor.

And, referring to Table 1 and the XRD analysis result of FIG. 6, although heat treatment for about 20 hours or longer was necessary to obtain nickel-aluminum alloy powder in Example 1a (see FIG. 3), nickel-aluminum alloy powder may be obtained with heat-treating time of only 3 hours by increasing the content of the reaction accelerator aluminum chloride ($AlCl_3$) to 0.5 wt % (Example 5) and 1 wt % (Example 6). This shows that the preparation time may be reduced by controlling the content of aluminum chloride.

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A method for preparing nickel-aluminum alloy powder at low temperature, comprising:
    preparing a powder mixture by mixing nickel powder and aluminum powder in a reactor and adding aluminum chloride into the reactor;
    vacuumizing the inside of the reactor and sealing the reactor; and
    preparing nickel-aluminum alloy powder by heat-treating the powder mixture in the sealed reactor at low temperature, range from 300° C. to 700° C. without supplying hydrogen gas and additional pulverization process,
wherein, in said vacuumizing the inside of the reactor, the degree of vacuum inside the reactor is maintained at $10^{-1}$ Torr of below.

2. The method for preparing nickel-aluminum alloy powder at low temperature according to claim 1, wherein, in said preparing the powder mixture, the aluminum powder is included in an amount of 0.1-24 wt % based on the weight of the powder mixture and the aluminum chloride.

3. The method for preparing nickel-aluminum alloy powder at low temperature according to claim 1, wherein, in said preparing the powder mixture, the aluminum chloride is included in an amount of 0.01-5 wt % based on the weight of the powder mixture and the aluminum chloride.

4. A green sheet manufactured with nickel-aluminum alloy powder prepared by the method according to claim 1.

5. An electrode for a fuel cell manufactured with nickel-aluminum alloy powder prepared by the method according to claim 1.

* * * * *